May 17, 1960     J. M. DE LUGT ET AL     2,936,837
DEVICE FOR DIGGING UP TUBERS AND THE LIKE
Filed Aug. 31, 1956     2 Sheets-Sheet 1

INVENTORS
JAN MARINUS DE LUGT
JAN PIETER VOSKUYLEN
BY
ATTORNEYS

May 17, 1960   J. M. DE LUGT ET AL   2,936,837
DEVICE FOR DIGGING UP TUBERS AND THE LIKE

Filed Aug. 31, 1956   2 Sheets-Sheet 2

INVENTORS
JAN MARINUS DE LUGT
JAN PIETER VOSKUIJEN
BY
ATTORNEYS

United States Patent Office 2,936,837
Patented May 17, 1960

2,936,837

DEVICE FOR DIGGING UP TUBERS AND THE LIKE

Jan Marinus de Lugt, Hazerswoude-Dorp, and Jan Pieter Voskuilen, Zuivenhuizen, Netherlands Application August 31, 1956, Serial No. 607,383

Claims priority, application Netherlands September 8, 1955

1 Claim. (Cl. 171—70)

The present invention relates to a device for digging up tubers and the like, more particularly potatoes, comprising means for digging up that is positioned at an angle to the direction of movement of the device said means consisting of a member such as a rotatable wheel that is connected to a hub and having such a number of spokes that it can retain potatoes dropping thereon, the free ends of the spokes being curved to the front as seen in the direction of movement.

In the known structures said members consist of disc-shaped ploughing irons having apertures to let pass the earth. Said irons turn the earth as a plough iron and the potatoes are raked out of the turned ridge by a member that cuts through the turned ridge and extends in a rake having teeth which lift the potatoes and cause same to slide downwardly.

To obtain a device that operates in a more suitable way than the known structure the member such as a rotatable wheel is in the device according to the invention provided with a positive drive, said wheel being positioned in an upright plane, the free ends of the spokes being curved out of the plane of the wheel, said spokes being resilient in a tangential direction in such a way that said ends can grip laterally in a ridge under the potatoes and move on in the way of a pronged fork, said ends being flexed towards each other and lifting to some extent, on leaving the ridge, the potatoes and some earth, then rebounding and permitting the earth to pass therethrough and permitting the potatoes to slide along said ends.

Because of the fact that the wheel grips laterally in the ridge much less resistance is met. The ends of the teeth are pressed into the ridge under the potatoes as a rotating pronged fork. During the cooperation of the ridge said teeth are compressed towards each other and penetrate in a resilient way into said ridge. On leaving said ridge said teeth rebound and act as a vibrating sieve through which the earth is vibrated. The potatoes are carried along over some distance and slide downwardly.

To improve the lateral discharge in the device according to the invention a collecting table is provided which is driven rotatably about a shaft, the general bottom plane extending parallel to the longitudinal axis of the device and making an angle with the surface of the ground of 30-60°, the axis of rotation being positioned behind the shaft of the digging-up member, intersects same, and is driven in such a way that the periphery of the collecting table runs in the same direction as the periphery of the digging-up member having the shape of a pronged fork.

In a preferred embodiment of the device according to the invention a driven wheel for casting away the tubers is provided at the upwardly sloping side of the collecting table having spokes which are similar in shape to those of the collecting table and of which the extremities are spaced in such a way that they fit between the spokes of the collecting table, the position of the shaft of said wheel for casting away the potatoes being such that the depth of interdigitation of said spokes is adjustable.

In the drawing embodiments of the device according to the invention are indicated diagrammatically by way of example.

Figure 1 shows a plan view of an embodiment of the device according to the invention.

Figure 2 indicates a side elevation of the same device.

Figure 1:
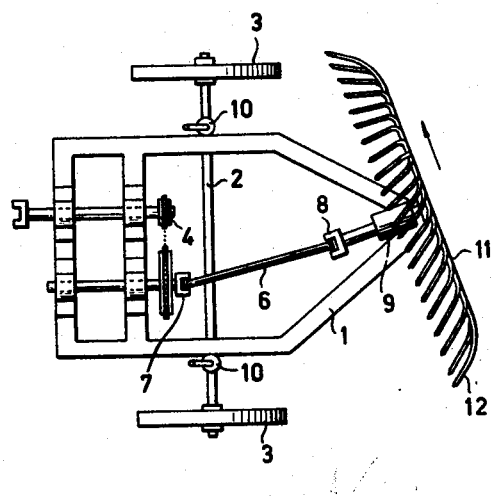
Figure 2:
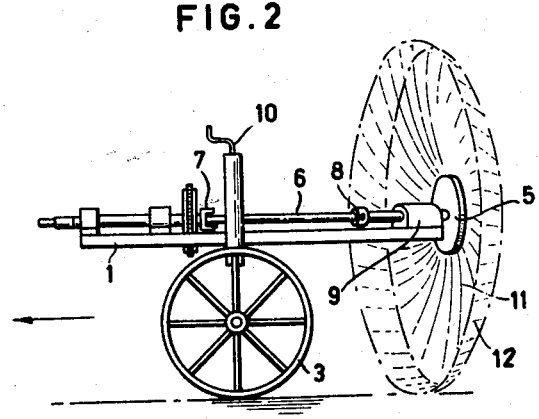

In the embodiment of the device according to the invention the carriage in which the digging-up member is mounted is provided with a frame 1, an axle 2, a running wheel 3 and a transmission 4 that is driven e.g. from the power-take-off of a tractor. Said transmission 4 is connected to the hub 5 of the digging-up member by means of a shaft 6 having universal joints 7 and 8. The shaft 6 has a bearing 9 carried by the frame 1. The frame 1 can be adjusted with regard to the wheel 3 by means of adjusting means 10. On adjusting the frame 1 the digging-up member therefore is also given an up-and-down movement. The adjusting means forms no part of the present invention and therefore no specific description will be given herein.

The digging-up member comprises the driven hub 5 mentioned before and the members 11 having the shape of a pronged fork, said members being clockwise rotated by said hub when viewed from the backside of the device. Said members 11 are curved helically with the direction of rotation and having extremities 12 which are curved in the direction of movement to the front. The shaft of the hub 5 makes an angle with the direction of movement of the device of approximately 30°. Said hub is rotated with approximately 1½ revolutions per yard and 4 inches of advance of the device. The prong-shaped members 11 grip with their curved extremities laterally in the ridge containing potatoes, dig said potatoes out of the ridge, the earth being crumbled away without damaging the potatoes, said potatoes being lifted and being passed laterally to a suitable conveyor. As the bottom side of the digging-up member lies approximately on the same level as the bottom side of the wheel 3 the extremities 12 grip underneath the complete depth of the ridge. The prong-shaped members are flexibly compressed towards each other in the ridge and on leaving said ridge rebound so that they act as a vibrating sieve.

Figure 4:
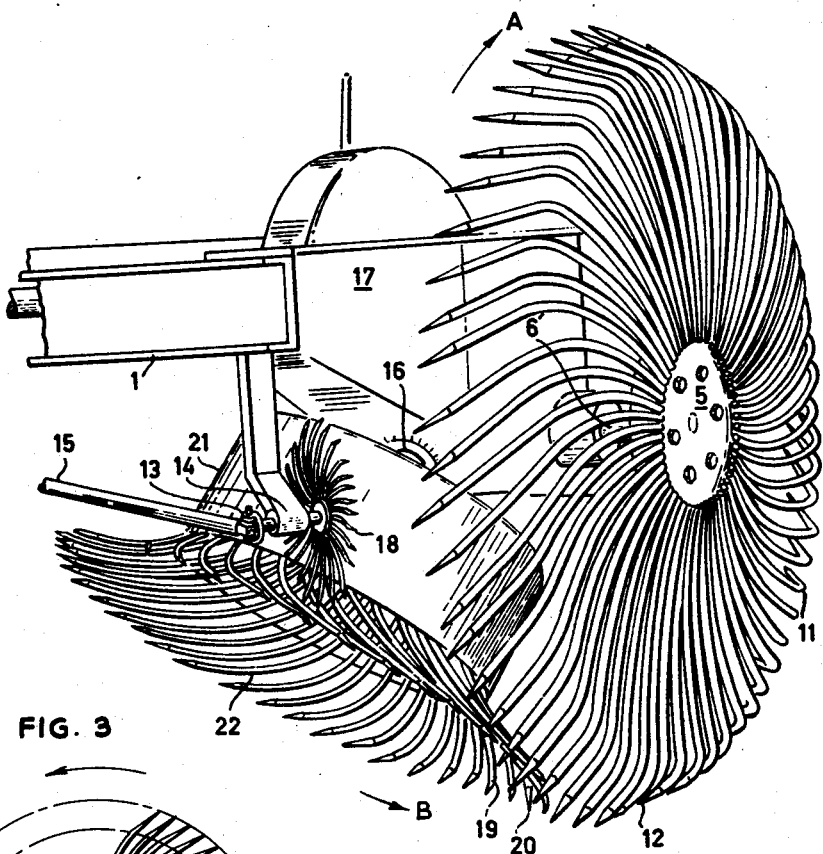
Figure 4 shows a perspective of a different embodiment of a device according to the invention.
Figure 3:
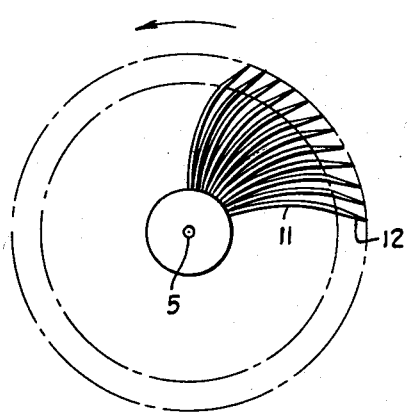
Figure 3 shows a front elevation of a portion of the digging-up member.

In the embodiment according to Figure 4 the collecting table consists of a hub (not shown) which is positioned in a sleeve 21 and is driven by a shaft 16 which is rotated through a conventional transmission 17 from which also the shaft 6' of the digging-up member is driven. On the aforesaid hub there are spokes 22 which are curved helically with the direction of rotation indicated with the arrow B. Said spokes form a hollow conical surface, the extremities 19 of the spokes 22 interdigitating with the extremities 12 of the spokes 11 of the digging-up member.

Said extremities 19 are provided with points 20 directed inwardly toward the sleeve axis. The sleeve 21 can be cylindrical and covers the upper ends of the spokes 22 adjacent to the hub in which said spokes are fixed.

A casting away wheel is provided for casting the potatoes to the back. The spokes 18 of said wheel have the same shape as those of the collecting table. The shaft of the casting away wheel 18 is rotatable in a bearing 14. The casting away wheel 18 is positioned at the rising side of the collecting table. The spokes of the casting away wheel 18 interdigitate between the spokes 22 of the collecting table.

The casting away wheel 18 is driven. The driving shaft 15 may be provided with a universal joint 13. The device according to the invention operates as follows:

The material which is dug up is raised by the prong-shaped members 11 of the digging-up member and transmitted to the spokes 22 of the collecting table which convey the material to the side. The sleeve 21 prevents that said material coils up and winds itself about the shaft 16. The material on the collecting table is cast away backwardly by the driven casting away wheel 18.

What is claimed is:

An apparatus for digging-up tubers and the like, such as potatoes, comprising a single digging-up element shaped as a rotatable wheel having means whereby its axis is in substantially horizontal position during operation, and said axis enclosing an angle with the direction of travel of the apparatus and said wheel being provided with driving means, said wheel having a hub and a number of curved teeth extending from said hub and having their major portions in a substantially flat upright plane and having convex sides directed forward in the direction of rotation of the wheel and the free ends of the teeth being directed out of said upright plane forward as seen in the direction of travel of the apparatus, a rotatable collecting wheel cooperating with said digging wheel and comprising a plurality of spokes forming a conical concave surface and the free ends of said spokes interdigitating with the ends of the teeth of the digging wheel, the ends of the spokes of said collecting wheel defining a plane enclosing an angle with a horizontal plane of between 30° to 60°.

References Cited in the file of this patent

UNITED STATES PATENTS 412,490    Ford   ---------------- Oct. 8, 1889